US009441595B2

(12) United States Patent
Fujino

(10) Patent No.: US 9,441,595 B2
(45) Date of Patent: Sep. 13, 2016

(54) FUEL INJECTION CONTROL DEVICE AND FUEL INJECTION CONTROL METHOD

(71) Applicant: DENSO CORPORATION, Kariya, Aichi-pref. (JP)

(72) Inventor: Tomoki Fujino, Okazaki (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 14/405,828

(22) PCT Filed: Apr. 24, 2013

(86) PCT No.: PCT/JP2013/002767
§ 371 (c)(1),
(2) Date: Dec. 5, 2014

(87) PCT Pub. No.: WO2013/183217
PCT Pub. Date: Dec. 12, 2013

(65) Prior Publication Data
US 2015/0114357 A1    Apr. 30, 2015

(30) Foreign Application Priority Data
Jun. 7, 2012   (JP) ................. 2012-129582

(51) Int. Cl.
| F02M 51/00 | (2006.01) |
| F02M 63/00 | (2006.01) |
| F02D 41/20 | (2006.01) |
| F02D 41/00 | (2006.01) |
| F02D 19/06 | (2006.01) |

(52) U.S. Cl.
CPC ...... *F02M 63/0017* (2013.01); *F02D 19/0607* (2013.01); *F02D 19/0647* (2013.01); *F02D41/0027* (2013.01); *F02D 41/20* (2013.01); *F02D 41/0025* (2013.01); *F02D 2041/2055* (2013.01); *F02D 2041/2058* (2013.01); *Y02T 10/36* (2013.01)

(58) Field of Classification Search
CPC ............... F02M 63/0017; F02M 63/0015; F02D 19/0607; F02D 19/061; F02D 19/0647; F02D 41/0027; F02D 41/20; F02D 41/34; F02D 41/345; F02D 41/0025; F02D 2041/2058; F02D 2041/2062; F02D 2041/2055
USPC ........ 123/525, 431, 472, 478, 490; 701/103, 701/104, 105
See application file for complete search history.

(56) References Cited

U.S. PATENT DOCUMENTS

| 6,223,731 B1 | 5/2001 | Yoshiume et al. |
| 2006/0137661 A1 | 6/2006 | Hayakawa |
| 2012/0318883 A1* | 12/2012 | Kusakabe ............... F02D 41/20 239/1 |

FOREIGN PATENT DOCUMENTS

| JP | 9-236060 | 9/1997 |
| JP | 2003-322067 | 11/2003 |

OTHER PUBLICATIONS

International Search Report and Written Opinion of ISA for PCT/JP2013/002767, mailed May 21, 2013, ten pages.

*Primary Examiner* — Hai Huynh
(74) *Attorney, Agent, or Firm* — Nixon & Vanderhye PC

(57) ABSTRACT

A CNG control ECU has a pulse signal determination device determining a pulse width and an output timing of a pulse signal, an electricity control device controlling a supply of electricity to a solenoid, and a current value sensing part sensing a current value of the solenoid. Further, the CNG control ECU has an estimation part estimating an injection start timing and an injection full opening timing on the basis of a differential value of the current value, a first calculation part calculating a first correction part, and a full opening time difference calculation part calculating a full opening time difference. Still further, the CNG control ECU has a correction injection quantity calculation part calculating a correction injection quantity and a second calculation part calculating a second correction value. A correction part makes a correction of adding the first correction value to the output timing and a correction of adding the second correction value to the pulse width.

14 Claims, 8 Drawing Sheets

FUEL INJECTION CONTROL DEVICE AND FUEL INJECTION CONTROL METHOD

CROSS REFERENCE TO RELATED APPLICATION

This application is the U.S. national phase of International Application No. PCT/JP2013/002767filed Apr. 24, 2013 which designated the U.S. and claims priority to Japanese Patent Application No. 2012-129582 filed on Jun. 7, 2012, the entire contents of each of which are hereby incorporated herein by reference.

TECHNICAL FIELD

The present disclosure relates to a fuel injection control device and a fuel injection control method for controlling electricity to be supplied to a solenoid of a fuel injection valve by a pulse signal to thereby control an injection of fuel by the fuel injection valve.

BACKGROUND ART

A fuel injection valve provided in an internal combustion engine using gasoline and natural gas as fuel has a valve member received in a body having an injection port formed in a tip portion thereof in such a way as to be freely moved back and forth. The valve member is moved by a magnetic force of a solenoid provided in the body to thereby open the injection port, whereby the fuel is injected into the engine from the fuel injection valve.

In the solenoid, a supply of electricity is controlled by an electronic control unit (ECU) for comprehensively controlling the driving of the engine. Specifically, the supply of the electricity to the solenoid is controlled on the basis of a pulse signal that the ECU determines according to a driving state of the engine. That is, the ECU determines a pulse width and an output timing of the pulse signal according to the driving state of the engine to thereby control a timing when the fuel is injected from the fuel injection valve and an injection quantity. When the supply of the electricity to the solenoid is stopped, the valve member is moved by a resilient force of a spring member provided in the fuel injection valve and by a pressure of the fuel, whereby the injection port is closed by the valve member.

An electric resistance of the solenoid is changed according to a temperature of the solenoid (coil) and a temperature of the surroundings, so that also a time characteristic of current flowing through the solenoid is changed along with the temperatures. For example, when the temperature of the solenoid is increased, the electric resistance of the solenoid is increased, whereby a time that elapses before a magnetic force necessary for attracting the valve member is generated is elongated. As a result, a timing when the valve member opens the injection port is delayed from a timing when a pulse signal is inputted. When the supply of the electricity to the solenoid is finished, the valve member is moved by the resilient force of the spring member and the pressure of the fuel, thereby instantaneously closing the injection port. For this reason, a timing when the valve member closes the injection port is made roughly constant irrespective of the temperature of the solenoid. As a result, in the case where the temperature of the solenoid is increased, only a timing when the fuel is injected is delayed, which results in reducing the total quantity of the fuel to be supplied from the fuel injection valve.

Deterioration with time of the fuel injection valve causes a frictional force between the valve member and the body to increase in some cases. In this case, even if the solenoid is under the same temperature condition, the response of the valve member is delayed and hence the injection quantity of the fuel is made less than expected.

For example, in a patent document 1 is disclosed a technique of calculating an integral value of current flowing through a solenoid and comparing the calculated integral value with a standard value and making a feedback control to thereby correct a pulse width of a pulse signal. Specifically, the pulse width is changed according to the ratio of the integral value to the standard value, whereby the injection quantity of the fuel to be injected from the fuel injection valve is controlled in such a way as to be close to a standard quantity.

The method disclosed in the patent document 1 aims to correct the pulse width to thereby correct a deviation in the injection quantity. For this reason, it is not considered that an injection state such as an injection timing and a timing when the fuel injection valve is fully opened is deviated from a target injection state because of a change in the temperature of the solenoid and the deterioration with time of the solenoid. Hence, the fuel cannot be injected under an appropriate state according to the driving state of the engine and in particular the injection timing is delayed, whereby the torque and the emission (HC) of the engine are likely to be increased.

RELATED ART LITERATURE

Patent Document

[Patent document 1] WO-2004/053317 A1

SUMMARY OF INVENTION

An objective of the present disclosure is to appropriately control an injection state of fuel by a fuel injection valve.

According to an aspect of the present disclosure, a fuel injection control device controls an electricity to be supplied to a solenoid of a fuel injection valve by a pulse signal to thereby control an injection of fuel by the fuel injection valve. The fuel injection control device has a current value sensing means for sensing a current value to show a magnitude of current flowing through the solenoid when the fuel is injected by the fuel injection valve; an estimation means for estimating an injection start timing when the injection of the fuel by the fuel injection valve is started and an injection full opening timing when the fuel injection valve is fully opened on the basis of a differential value of the current value sensed by the current value sensing means; and a setting means for setting the pulse signal on the basis of the injection start timing and the injection full opening timing which are estimated by the estimation means.

According to a first aspect of the present disclosure, the electricity supplied to the solenoid of the fuel injection valve is controlled by the pulse signal, whereby the injection of the fuel by the fuel injection valve is controlled. When the fuel is injected by the fuel injection valve, the current value to show the magnitude of the current flowing through the solenoid is sensed.

The present inventor has found that when the injection of the fuel by the fuel injection valve is started or when the fuel injection valve is fully opened, a distinctive change develops in the current value of the solenoid. Specifically, the current value of the solenoid starts to increase by the pulse signal and then decreases as the injection of the fuel by the fuel injection valve is started. Further, the decreased current value increases as the fuel injection valve is fully opened.

According to the construction described above, the injection start timing when the injection of the fuel by the fuel injection valve is started and the injection full opening timing when the fuel injection valve is fully opened is estimated on the basis of the differential value of the sensed current value. For this reason, the injection start timing and the injection full opening timing can be estimated exactly. The pulse signal is set on the basis of the injection start timing and the injection full opening timing that are estimated. Hence, the injection start timing and the injection full opening timing can be appropriately controlled.

According to a second aspect of the present disclosure, a fuel injection control device controls an electricity to be supplied to a solenoid of a fuel injection valve by a pulse signal to thereby control an injection of fuel by the fuel injection valve. The fuel injection control device has a pulse signal determination means for determining a pulse width and an output timing of the pulse signal; a current value sensing means for sensing a current value to show a magnitude of current flowing through the solenoid by the electricity supplied to the solenoid on the basis of the pulse signal determined by the pulse signal determination means; an estimation means for estimating an injection start timing when the injection of the fuel by the fuel injection valve is started and an injection full opening timing when the fuel injection valve is fully opened on the basis of a differential value of the current value sensed by the current value sensing means; a first correction value calculation means for calculating a first correction value that is a difference between a standard injection start timing set in advance and the injection start timing estimated by the estimation means; a full opening time difference calculation means for calculating a full opening time difference that is a difference between a standard injection full opening timing set in advance and the injection full opening timing estimated by the estimation means; a correction injection quantity calculation means for calculating a correction injection quantity on the basis of the first correction value and the full opening time difference, the correction injection quantity being a difference between an injection quantity in a case where the fuel injection valve is activated at the injection start timing and the injection full opening timing which are estimated by the estimation means and an injection quantity in a case where the fuel injection valve is activated at the standard injection start timing and the standard injection full opening timing; a second correction value calculation means for calculating a second correction value that is a time necessary for the fuel injection valve to inject the fuel of the correction injection quantity calculated by the correction injection quantity calculation means; and a setting means for adding the first correction value calculated by the first correction value calculation means to the output timing of the pulse signal determined on the next time and thereafter by the pulse signal determination means and for adding the second correction value calculated by the second correction value calculation means to the pulse width of the pulse signal.

According to a third aspect of the present disclosure, the correction of adding the first correction value, which is a deviation from the output timing of the standard, to the output timing of the pulse signal and the correction of adding the second correction value, which is necessary for injecting the correction injection quantity that is a deviation from the injection quantity of the standard, to the pulse width of the pulse signal are made. Hence, the injection quantity of the fuel and the timing when the fuel is injected can, be corrected at the same time, whereby an appropriate quantity of fuel can be injected from the fuel injection valve at an appropriate timing. As a result, the timing when the fuel is injected is shifted, which can solve the problem that the torque and the emission (HC) of the engine increase. In addition, the estimation means estimates the injection start timing and the injection full opening timing on the basis of the differential valve of the current value of the solenoid and hence can accurately get the behavior of the fuel injection valve when the fuel injection valve is opened, thereby being able to find the first correction value and the second correction value with a high accuracy. As a result, the pulse signal can be appropriately corrected by the setting means and hence the timing when the fuel is injected and the injection quantity can be exactly corrected.

According to a fourth aspect of the present disclosure, the estimation means estimates that a timing when the current value first becomes a maximum value after the electricity is supplied to the solenoid is the injection start timing.

According to a fifth aspect of the present disclosure, the estimation means estimates that a timing when the current value first becomes a maximum value is the injection start timing. Thus, the fuel injection timing of the fuel injection valve can be correctly obtained.

According to a sixth aspect of the present disclosure, the estimation means estimates that after the electricity is supplied to the solenoid is the injection full opening timing.

Since a timing when the current value first becomes a minimum value is estimated as the injection full opening timing, the injection full opening timing can be correctly obtained.

According to a seventh aspect of the present disclosure, a fuel injection control method for controlling electricity to be supplied to a solenoid of a fuel injection valve by a pulse signal to thereby control an injection of fuel by the fuel injection valve, the fuel injection control method includes: a determination step for determining a pulse width and an output timing of the pulse signal; a step for supplying the electricity to the solenoid at the output timing and the pulse width of the pulse signal which are determined by the determination step; a sensing step for sensing a current value to show a magnitude of current flowing through the solenoid by the electricity supplied to the solenoid; an estimation step for estimating an injection start timing when an injection of the fuel by the fuel injection valve is started and an injection full opening timing when the fuel injection valve is fully opened on the basis of a differential value of the current value sensed by the sensing step; a step for calculating a first correction value that is a difference between a standard injection start timing set in advance and the injection start timing estimated by the estimation step; a step for calculating a full opening time difference that is a difference between a standard injection full opening timing set in advance and the injection full opening timing estimated by the estimation step; a first calculation step for calculating a correction injection quantity on the basis of the first correction value and the full opening time difference, the correction injection quantity being a difference between an injection quantity injected from the fuel injection valve in a case where the fuel injection valve is activated at the injection start timing and the injection full opening timing which are estimated by the estimation step and an injection quantity injected from the fuel injection valve in a case where the fuel injection valve is activated at the standard injection start timing and the standard injection full opening timing; a second calculation step for calculating a second correction value that is a time necessary for the fuel injection valve to inject the fuel of the correction injection quantity calculated by the first calculation step; and a correction step for adding the first correction value calculated by the first calculation step to the output timing of the pulse signal determined on the next time and thereafter by the determination step and adding the second correction value calculated by the second calculation step to the pulse width of the pulse signal to thereby correct the pulse signal.

According to an eighth aspect of the present disclosure, the correction of adding the first correction value, which is a deviation from the output timing of the standard, to the output timing of the pulse signal and the correction of adding the second correction value, which is necessary for injecting the correction injection quantity that is a deviation from the injection quantity of the standard, to the pulse width of the pulse signal are made. Hence, the injection quantity of the fuel and the timing when the fuel is injected can be corrected at the same time, whereby an appropriate quantity of fuel can be injected into an internal combustion engine from the fuel injection valve at an appropriate timing. As a result, the timing when the fuel is injected is shifted, which can solve the problem that the torque and the emission (HC) of the engine increase. In addition, in the estimation step, the injection start timing and the injection full opening timing are estimated on the basis of the differential valve of the current value of the solenoid, so that the behavior of the fuel injection valve when the fuel injection valve is opened can be accurately got and hence the first correction value and the second correction value can be found with a high accuracy. As a result, the pulse signal can be appropriately corrected by the setting means and hence the timing when the fuel is injected and the injection quantity can be exactly corrected.

BRIEF DESCRIPTION OF DRAWINGS

The above-mentioned objectives, the other objectives, the features and advantages of the present disclosure will be made clearer by the following detailed description with reference to the accompanying drawings.

EMBODIMENTS FOR CARRYING OUT INVENTION

Figure 1:
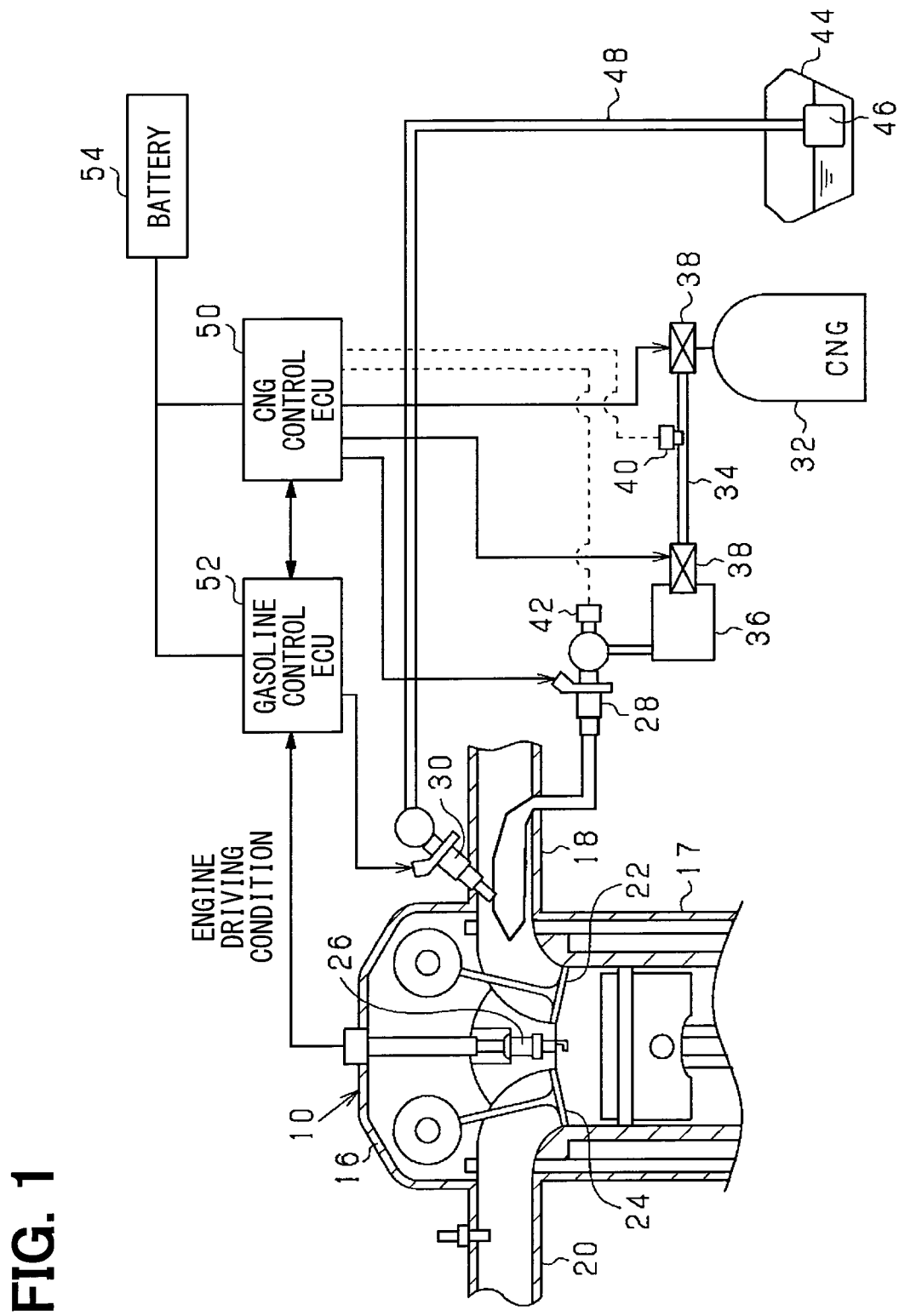
FIG. 1 is a system construction diagram of an engine mounted with a CNG control ECU and a gasoline control ECU according to a present embodiment.

Fuel injection control devices 50, 52 and a fuel injection control method according to the present embodiment will be described. As shown in FIG. 1, in the present embodiment, the fuel injection control devices 50, 52 are employed in a so-called bi-fuel engine (internal combustion engine) 10 which uses a gaseous fuel and a liquid fuel as fuel at the same time. In the bi-fuel engine 10, a compressed natural gas (CNG) is used as the gaseous fuel and gasoline is used as the liquid fuel. In the present embodiment, two of a CNG control ECU 50 for performing the injection control of the CNG and a gasoline control ECU 52 for performing the injection control of the gasoline are constructed in parallel as fuel injection control devices.

FIG. 1 is a section view to show one cylinder of a multi-cylinder bi-fuel engine 10 (hereinafter simply referred to as "an engine"). This engine 10 is constructed in such a way that a cylinder head 16, which has a combustion chamber partitioned therein, and a cylinder block 17 have an intake port 18 and an exhaust port 20 connected thereto. The intake port 18 and the exhaust port 20 have an intake valve 22 and an exhaust valve 24 provided therein respectively. The cylinder head 16 has an ignition coil 26 provided therein toward the combustion chamber.

The intake port 18 is provided with a gas injection valve (fuel injection valve) 28 for injecting the CNG and a gasoline injection valve (fuel injection valve) 30 for injecting the gasoline. The gas injection valve 28 is connected to a CNG fuel container 32 in which the CNG is stored in a compressed state (for example, approximately 20 MPa) via a gas supply pipe 34. The gas supply pipe 34 is provided with a regulator 36 and the CNG supplied from the CNG fuel container 32 has its pressure reduced to 0.4 MPa by the regulator 36.

The gas supply pipe 34 has shutoff valves 38, 38 provided respectively on the outlet side of the CNG fuel container 32 and on the inlet side of the regulator 36. By opening or closing both of the shutoff valves 38, 38, the supply of the CNG from the CNG fuel container 32 to the gas injection valve 28 is controlled. The gas supply pipe 34 has a gas pressure sensor 40 provided between both of the shutoff valves 38, 38 and the pressure of the CNG supplied from the CNG fuel container 32 is measured with the gas pressure sensor 40. The gas injection valve 28 is provided with a gas temperature & pressure sensor 42 for measuring the temperature and the pressure of the CNG supplied to the gas injection valve 28.

The gasoline injection valve 30 is connected to a pump 46 provided in a gasoline tank 44 via a liquid supply pipe 48 and the gasoline in the gasoline tank 44 is pressure-fed to the gasoline injection valve 30 by the pump 46.

The engine 10 of the present embodiment can have a driving mode (CNG mode and a gasoline mode) switched under a specified condition, whereby either the gasoline or the CNG is used as the fuel according to the driving mode. In the CNG mode, the supply of the CNG to the engine 10 from the gas injection valve 28 is controlled by the CNG control ECU 50. In the gasoline mode, the supply of the gasoline to the engine 10 from the gasoline injection valve 30 is controlled by the gasoline control ECU 52.

The CNG control ECU 50 has the pressure of the CNG, which is measured by the gas pressure sensor 40, and the temperature and the pressure of the CNG, which are measured by the gas temperature & pressure sensor 42, inputted thereto. The CNG control ECU 50 determines a valve opening/closing time (pulse width) of the gas injection valve 28 on the basis of the inputted temperature and pressure and the information of the driving state of a vehicle.

[With Regard to Gas Injection Valve 28]

Figure 3:
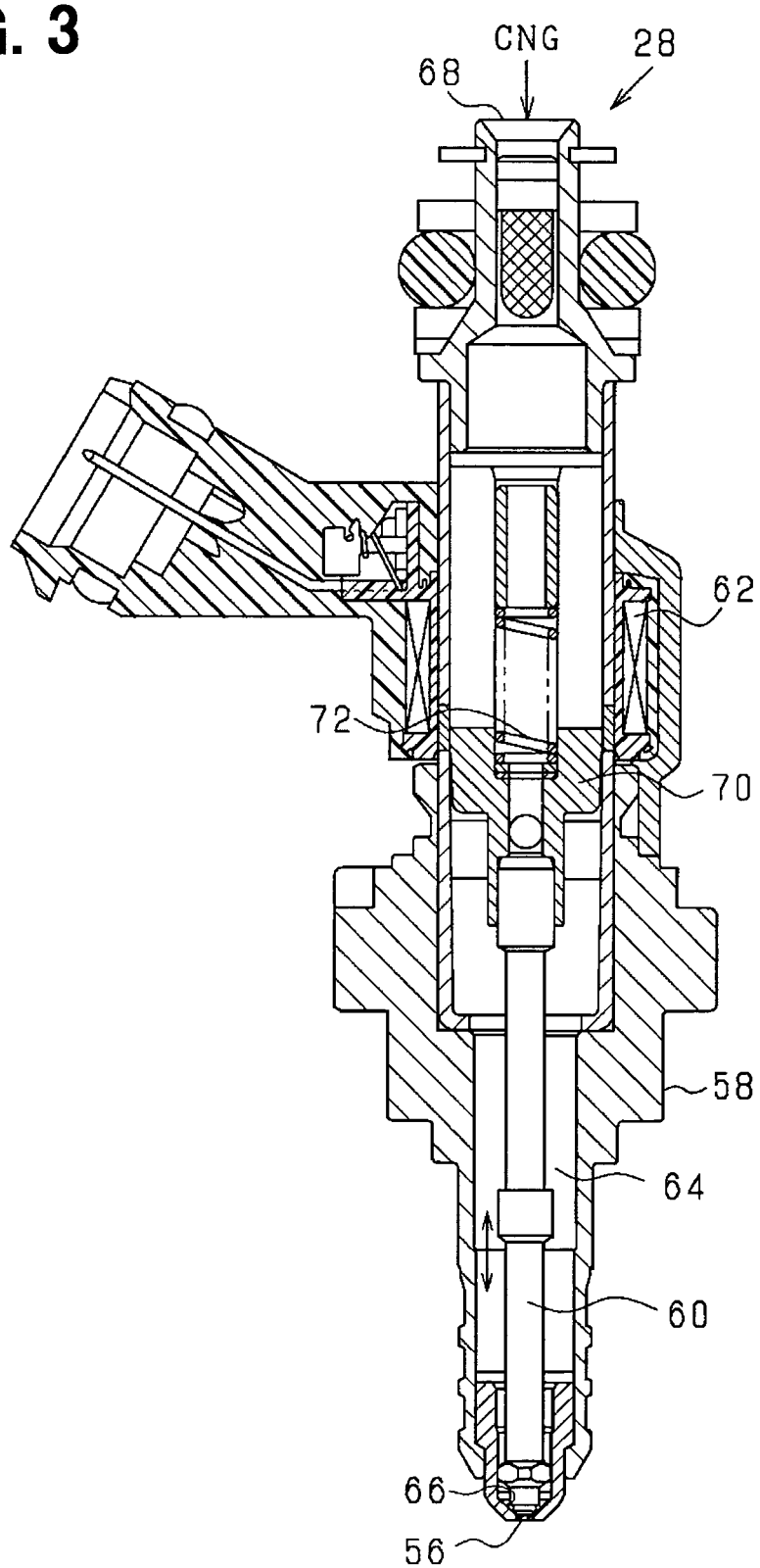
FIG. 3 is a section view to illustrate a gas injection valve.

The gas injection valve 28 will be described in the following. The gasoline injection valve 30 basically has the same construction as the gas injection valve 28, so that the description of the gasoline injection valve 30 will be omitted. FIG. 3 is a section view to illustrate the gas injection valve 28. The gas injection valve 28 is basically constructed of: a body 58 which has an injection port 56 formed therein; a needle valve (valve member) 60 which is provided in the body 58; and a solenoid 62. In FIG. 3 is not shown the gas temperature & pressure sensor 42. The body 58 has a fuel passage 64 formed therein, the fuel passage 64 communicating with the injection port 56. The fuel passage 64 has the needle valve 60 provided therein in such a way as to freely move back and forth in the direction in which the fuel passage 64 is extended. An end portion, which has the injection port 56 formed therein, of the body 58 has a tapered seat face 66 formed on an inner peripheral face thereof, the tapered seat face 66 having a sealing ability. An end portion, which is opposite to the injection port 56, of the body 58 has an inlet port 68 connected to the gas supply pipe 34 and the CNG is supplied into the fuel passage 64 via the inlet port 68.

The needle valve 60 is a bar-shaped body having a specified length and one end portion of the needle valve 60 has a sectional shape larger than the opening area of the injection port 56. The one end portion of the needle valve 60 abuts on the seat face 66, whereby the injection port 56 is closed by the needle valve 60 and hence the injection of the CNG is inhibited. On the other hand, when the one end portion of the needle valve 60 is separated from the seat face 66, the injection port 56 is opened and hence the CNG in the fuel passage 64 is injected via the injection port 56.

The other end portion of the needle valve 60 is coupled to a plunger 70 moved back and forth by the magnetic force of the solenoid 62. The fuel passage 64 has a valve spring (biasing means) 72 provided in a contracted state on the side opposite to the needle valve 60 in the plunger 70. The valve spring 72 is always brought into a state where the plunger 70 is biased to the injection port 56 side (downward in FIG. 3) by its resilient force. The solenoid 62 is a cylindrical body provided in such a way as to surround the fuel passage 64 and is electrically connected to a battery 54 as an electricity supply means via an electricity control means 74 which will be described later. When electricity is supplied to the solenoid 62 from the battery 54, the solenoid 62 generates a magnetic force. The plunger 70 is attracted by the magnetic force in a direction to separate from the injection port 56 (upward in FIG. 3) against the resilient force of the valve spring 72.

That is, the needle valve 60 is held in a position to close the injection port 56 (hereinafter referred to as "a closed position") by the resilient force of the valve spring 72 in a state where the electricity is not supplied to the solenoid 62. When the solenoid 62 is supplied with the electricity, the one end portion of the needle valve 60 is moved to a position separate from the injection port 56 by a specified distance (hereinafter referred to as "a fully opened position"). The needle valve 60 is constructed in the following manner: that is, when the supply of the electricity to the solenoid 62 is finished, the needle valve 60 is instantaneously returned to the closed position by the resilient force of the valve spring 72 and the pressure of the CNG.

[With Regard to CNG Control ECU 50]

A specific construction of the CNG control ECU 50 will be described below. The control construction and the control method of the gasoline control ECU 52 are basically the same as those of the CNG control ECU 50. Hence, the description of the gasoline control ECU 52 will be omitted.

The CNG control ECU 50 is constructed of a microcomputer having a CPU, a RAM, a ROM, a flash memory, an input/output interface, and the like. In this regard, the CNG control ECU 50 and the gasoline control ECU 52 are electrically connected to each other and share information relating to the control states of the injection valves 28, 30 and the driving state of the engine 10.

Figure 2:
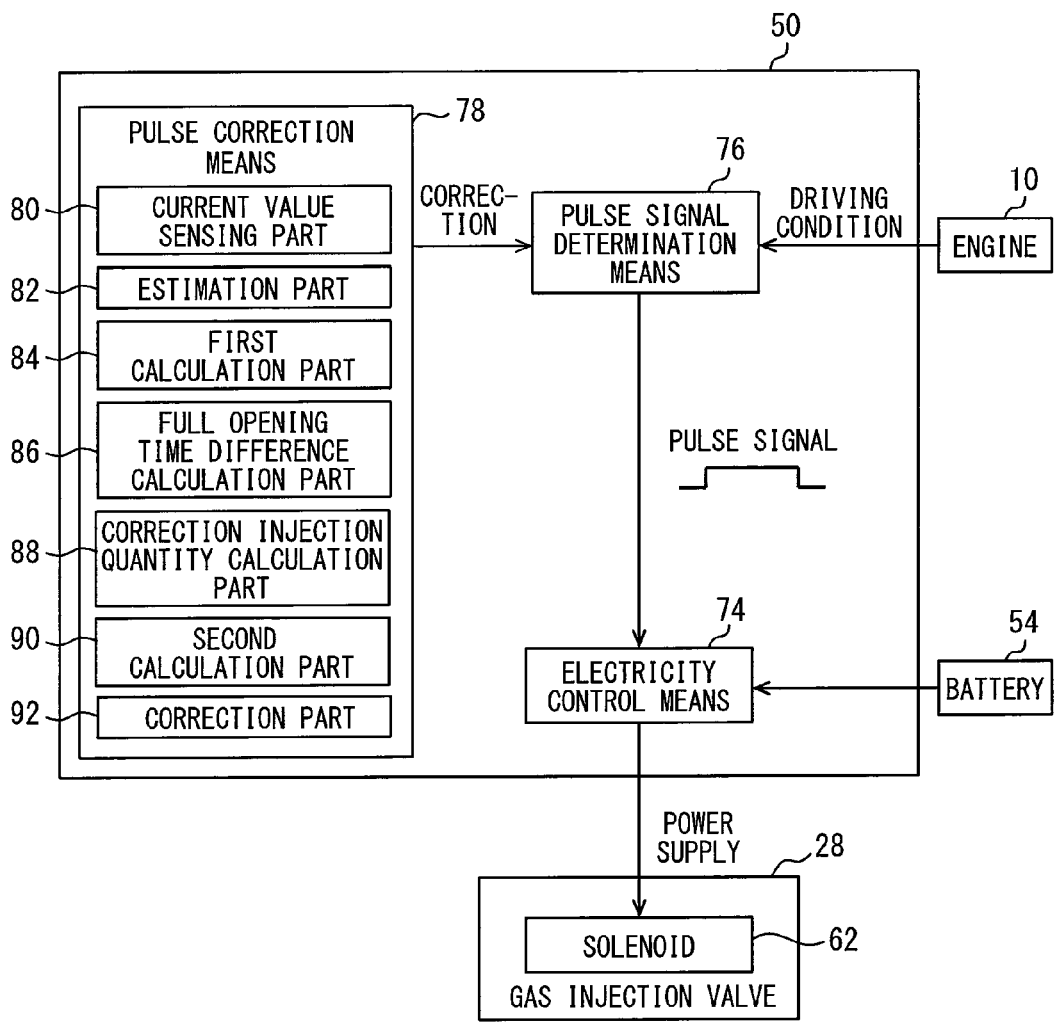
FIG. 2 is a block diagram to show the CNG control ECU.

As shown in FIG. 2, the CNG control ECU 50 has the electricity control means 74 for controlling the supply of the electricity to the gas injection valve 28 from the battery 54 on the basis of a pulse signal, a pulse signal determination means 76 for determining a pulse signal, and a pulse correction means 78 for correcting the pulse signal determined by the pulse signal determination means 76. The functions of the respective means constructing the CNG control ECU 50 are realized by a hardware resource having its function specified by its construction itself, a hardware resource having its function specified by a program, or by a combination of these hardware resources. The functions of these plural means are not limited to the functions realized by the hardware resources which are physically independent from each other.

The electricity control means 74 is constructed of switching elements which are intervened between the battery 54 and the solenoid 62 and which turn on/off the supply of the electricity to the solenoid 62. The electricity control means 74 is usually in a state in which the supply of the electricity to the solenoid 62 from the battery 54 is inhibited. When the electricity control means 74 has a pulse signal inputted thereto from the pulse signal determination means 76, the electricity control means 74 supplies the electricity to the solenoid 62 from the battery 54 at a timing when the pulse signal is inputted. Further, the electricity control means 74 supplies the electricity to the solenoid 62 only during a period in which the pulse signal is being inputted (that is, a pulse width of the pulse signal). In this regard, the electricity control means 74 applies a maximum voltage (for example, 12 V) of the battery 54 to the solenoid 62 during a period in which the needle valve 60 is moved from the closed position to the fully opened position. After the needle valve 60 reaches the fully opened position, the electricity control means 74 applies a small voltage (for example, 6 V) for holding the needle valve 60 at the fully opened position to the solenoid 62.

The pulse signal determination means 76 has various kinds of data inputted thereto, the various kinds of data relating to the driving state of the engine 10, and determines the pulse signal according to the inputted data. As the data showing the driving state of the engine 10 include the rotation speed of the engine 10, the operating amount of an accelerator, and the water temperature of the engine 10. The pulse signal determination means 76 has the pressure of the CNG, which is measured by the gas pressure sensor 40, and the temperature and the pressure of the CNG, which are measured by the gas temperature & pressure sensor 42, inputted thereto. Further, the pulse signal determination means 76 has a pulse signal map stored therein, the pulse map being specified in correspondence to the driving state of the engine 10 and the temperature and the pressure of the CNG. The pulse signal determination means 76 determines the pulse width of the pulse signal and an output timing when the pulse signal is outputted to the electricity control means 74, that is, the timing when the electricity is supplied to the solenoid 62, with reference to the pulse signal map.

The pulse correction means 78 corrects the pulse signal determined by the pulse signal determination means 76 in consideration of a change in the response characteristic of the needle valve 60 which is caused by the temperature and the deterioration with time of the solenoid 62. Hereinafter, a method for correcting a pulse signal by the pulse correction means 78 will be described in detail.

Figure 4:
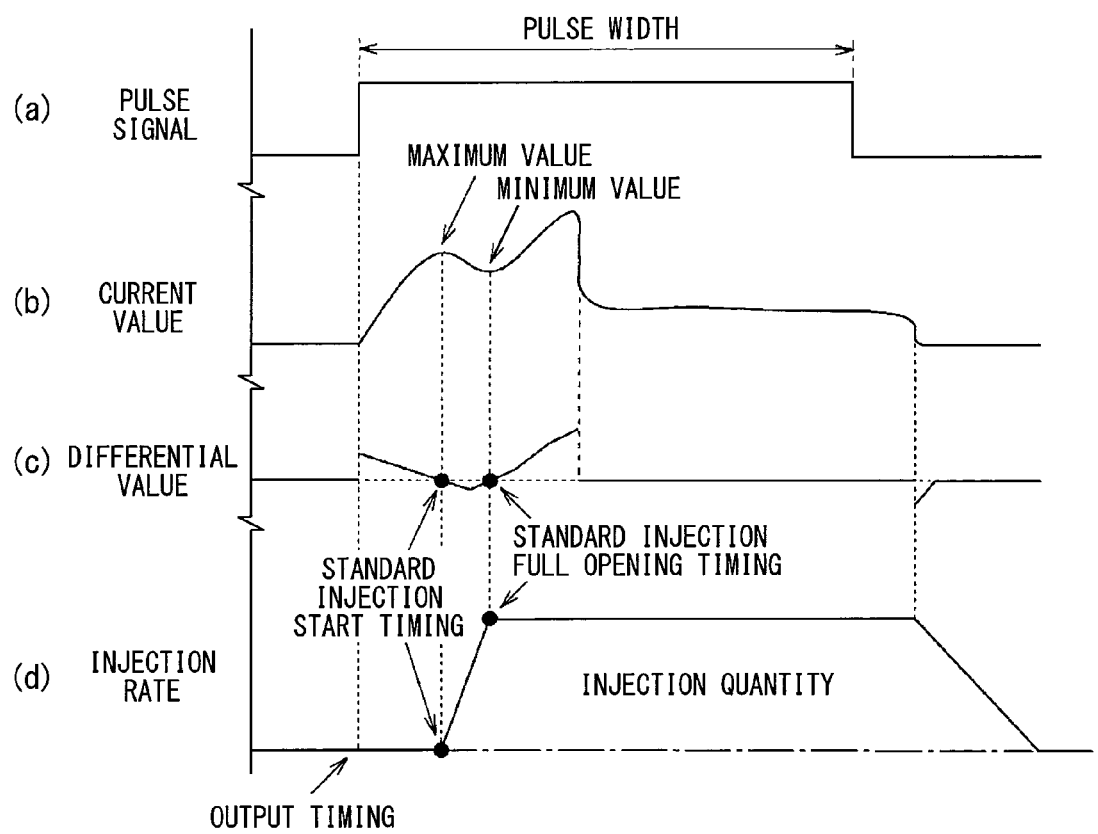
FIG. 4 are timing charts in a case where electricity is supplied to a gas injection valve in a standard state.

The response characteristic of the needle valve 60 in the case where the electricity is supplied to the solenoid 62 in the gas injection valve 28 under an ideal condition will be described. The ideal condition means a case where the solenoid 62 is at an optimal temperature and a state in which the gas injection valve 28 is not yet used (a state in which a frictional resistance is low). In the following description, the response characteristic of the needle valve 60 under the ideal condition is referred to as a standard state. FIG. 4(*a*) shows a pulse signal, FIG. 4(*b*) shows a current value of current flowing through the solenoid 62, FIG. 4(*c*) shows a differential value of the current value, and FIG. 4(*d*) shows an injection rate of the CNG.

As shown in FIG. 4(*b*), when the pulse signal is inputted, the current flowing through the solenoid 62 goes up in an arc, thereby making the solenoid 62 generate a magnetic force. However, as shown in FIG. 4(*d*), the magnetic force just after the current flowing through the solenoid 62 is smaller than the resilient force of the valve spring 72 and the pressure of the CNG and hence the needle valve 60 is held at the closing position by the resilient force (injection rate is zero). Then, when the magnetic force is made larger than the resilient force of the valve spring 72 or the pressure of the CNG, the needle valve 60 starts to move from the closed position. Thereafter, a timing when the needle valve 60 starts to move from the closed position in the standard state is referred to as a standard injection start timing. As shown in FIGS. 4B and 4C, the standard injection start timing is a timing when the current value becomes a maximum value and when the differential value of the current value changes from "+" to "−".

As shown in FIG. 4(*d*), the injection rate during a period in which the needle valve 60 is moved goes up linearly. Further, as shown in FIG. 4(*b*), the current value goes down in an arc during a period in which the needle valve 60 is moved from the closed position to the fully opened position.

When the needle valve 60 reaches the fully opened position, as shown in FIGS. 4B and 4C, the current value shows a minimum value and the differential value of the current value changes from "−" to "+". Hereinafter, a timing when the needle valve 60 reaches the fully opened position in the standard state is referred to as a standard injection full opening timing. As shown in FIG. 4(*d*), when the needle valve 60 reaches the fully opened position, the injection rate becomes a constant value (hereinafter referred to as a maximum injection rate) depending on an opening area of the injection port 56 of the gasoline injection valve 30. In this regard, as shown in FIG. 4(*b*), after the standard injection full opening timing (when the current value of the solenoid 62 becomes a minimum value), the current value of the solenoid 62 goes up in an arc and then goes down and then becomes a nearly constant value. This is because as described above, after the needle valve 60 reaches the fully opened position, the voltage to be supplied to the solenoid 62 is weakened by the control of the electricity control means 74 and a holding current is made to flow through the solenoid 62.

When the inputting of the pulse signal is finished, as shown in FIG. 4(*b*), the current value becomes zero after a little delay because of the inductance of the solenoid 62. When the current value becomes zero, the resilient force of the valve spring 72 and the pressure of the CNG become larger than the magnetic force of the solenoid 62 and hence the needle valve 60 is moved from the fully opened position to the closed position. At this time, as shown in FIG. 4(*d*), the injection rate goes down linearly. In this way, the injection rate of the gas injection valve 28 changes with time in the shape of a trapezoid with respect to one pulse signal. The area of the trapezoid shows an injection quantity injected from the gas injection valve 28.

Figure 5:
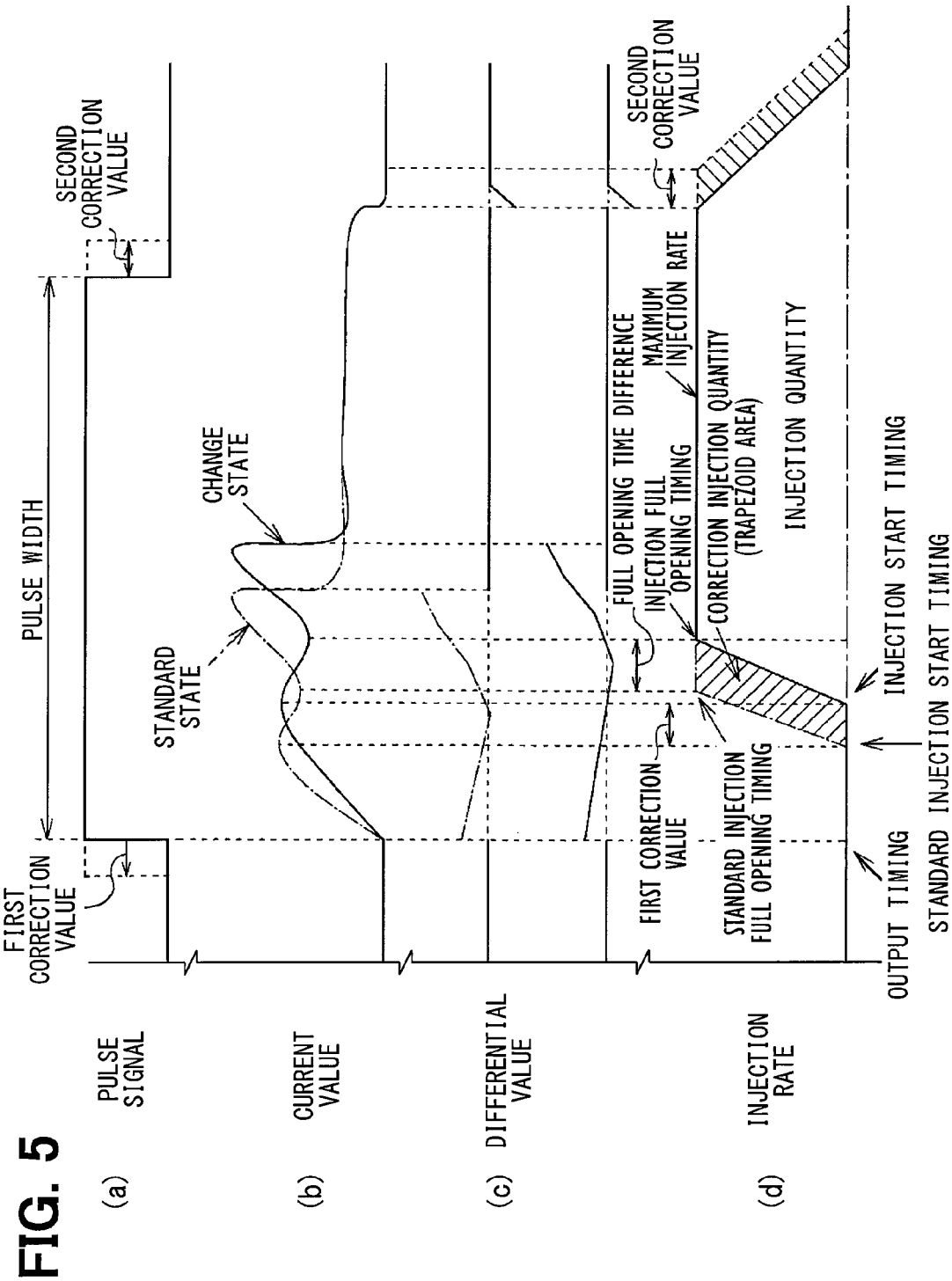
FIG. 5 are timing charts to show a case where electricity is supplied to a gas injection valve in a state where a response characteristic of a needle valve is delayed with respect to a standard state in comparison with the standard state.

Next, a case where the response characteristic of the needle valve 60 changes (hereinafter referred to as "a change state") will be described in comparison with the standard state described above. In the following will be described a case where the response characteristic of the needle valve 60 is delayed as compared with the standard state because the electric resistance of the solenoid 62 is increased by a rise in the temperature of the solenoid 62 or because the frictional resistance of the needle valve 60 is increased by deterioration with time. FIG. 5(*a*) shows a pulse signal, FIG. 5(*b*) shows a current value of current flowing through the solenoid 62, FIG. 5(*c*) shows a differential value of the current value, and FIG. 5(*d*) shows an injection rate. Each solid line in FIG. 5 shows a graph in the change state, whereas each single dot & dash line shows a graph in the standard state. In this regard, in each graph, it is assumed that a drive pulse signal having the same pulse width is outputted at the same output timing.

When the pulse signal is outputted, as shown in FIGS. 5(*a*) and 5(*b*), the current value in the change state goes up moderately as compared with the standard state because the electric resistance of the solenoid 62 is large. For this reason, a timing when the current value becomes a maximum value is delayed as compared with the standard state. That is, a timing when the needle valve 60 starts to move from the closed position (hereinafter referred to as "an injection start timing") is later than the standard injection start timing. Similarly, as compared with the standard state, the current value in the change state goes down moderately from a maximum value and a timing when the current value becomes a minimum value is delayed. In other words, in the change state, a timing when the needle valve 60 reaches the fully opened position (hereinafter referred to as "an injection full opening timing") is also delayed as compared with the standard injection full opening timing.

On the other hand, as for the injection rate from the injection start timing to the injection full opening timing, as shown in FIG. 5(*d*), the graph in the change state goes up linearly at a little smaller gradient than in the standard state. However, in a state where the needle valve 60 reaches the fully opened position, a maximum injection rate depends on the opening area of the injection port 56 and a change in the current value does not contribute to the maximum injection rate, so that the injection rate in the change state becomes constant at the same maximum injection rate as in the standard state.

When the outputting of the pulse signal is finished, as shown in FIG. 5(*b*), as is the case with the standard state, the current value in the change state is slightly delayed with respect to the standard state and then is brought to zero. At this time, the injection rate in the change state, as shown in FIG. 5(*d*), goes down linearly at the same timing and at the same gradient as in the standard state. This is because in either case of the change state and the standard state, the needle valve 60 is returned to the closed position by the resilient force of the valve spring 72 and the pressure of the CNG, that is, because a change in the current value does not have an effect on the injection rate of the needle valve 60.

As shown in FIG. 5(*d*), the needle valve 60 in the change state is delayed with respect to the standard state by an absolute value of a difference (hereinafter referred to as "a first correction value") between the standard injection start timing and the injection start timing. In other words, when an output timing of the pulse signal in the change state is advanced by the difference, the injection start timing can be made equal to the standard injection start timing.

An injection quantity in the change state is decreased by an area shown by a shaded portion on the left side of FIG. 5(*d*) as compared with an injection quantity in the standard state. When it is assumed that a difference between the injection full opening timing and the standard injection full opening timing is a full opening time difference, the area can be found as the area of a trapezoid in which: an absolute value of the first correction value is a lower base (one base side); an absolute value of the full opening time difference is an upper base (other base side); and the maximum injection rate is a height (refer to a shaded portion on the left side of FIG. 5(*d*)). Hence, in order that the injection quantity in the change state may be equal to the injection quantity in the standard state, it is only necessary to enlarge the pulse width of the pulse signal to thereby increase the injection quantity in the change state by an injection quantity that is equal to the area of this trapezoid (hereinafter referred to as "a correction injection quantity"). In other words, it is only necessary to increase the pulse width by a base side of a parallelogram which is shown by a shaded portion on the right side of FIG. 5(*d*) and the area of which is made to be equal to the area of the trapezoid described above (hereinafter, this increase in the pulse width is referred to as "a second correction value").

On the basis of these findings, the pulse correction means 78 calculates the first correction value and the second correction value to thereby correct the pulse signal. Specifically, the pulse correction means 78, as shown in FIG. 2, is constructed of: a current value sensing part (current value sensing means) 80; an estimation part (estimation means) 82; a first calculation part (first correction value calculation means) 84; a full opening time difference calculation part (full opening time difference calculation means) 86; a correction injection quantity calculation part (correction injection quantity calculation means) 88; a second calculation part (second correction value calculation means) 90; and a correction part (setting means) 92. Further, the pulse correction means 78 has the standard injection start timing, the standard injection full opening timing, and the value of the maximum injection rate stored therein in advance.

The current value sensing part 80 senses a current value of current, which flows through the solenoid 62 when the solenoid 62 is supplied with the electricity from the battery 54, on the basis of the sensed value of a current sensor (not shown) and stores the current value. The estimation part 82 calculates a differential value from the current value sensed by the current value sensing part 80 and determines a timing when the current value first becomes a maximum value and a timing when the current value first becomes a minimum value from the differential value. That is, the estimation part 82 estimates that a timing when the differential value of the current value first changes from "−" to "+" after the solenoid 62 is supplied with the electricity is the injection start timing. Further, the estimation part 82 estimates a timing when the differential value of the current value first changes from "−" to "+" after the solenoid 62 is supplied with the electricity is the injection full opening timing.

The first calculation part 84 is set in such a way as to find a difference between the standard injection start timing, which is stored in advance in the pulse correction means 78, and the injection start timing, which is estimated by the estimation part 82, to thereby find the first correction value. In this regard, in a state where the response characteristic of the needle valve 60 is delayed with respect to the standard state, the first correction value calculated by the first calculation part 84 becomes a minus value.

The full opening time difference calculation part 86 finds a difference between the standard injection full opening timing, which is set in advance in the pulse correction means 78, and the injection full opening timing, which is estimated by the estimation part 82, to thereby find the full opening time difference. In this regard, in a state where the response characteristic of the needle valve 60 is delayed with respect to the standard state, the full opening time difference calculated by the full opening time difference calculation part 86 becomes a minus value.

The correction injection quantity calculation part 88 is set in such a way as to calculate the correction injection quantity (a decrease in the injection quantity caused by the delay of the needle valve 60), which is a difference between the injection quantity injected from the gas injection valve 28 and the injection quantity in the standard state. In other words, the correction injection quantity calculation part 88, as shown in FIG. 5(*d*), finds the area of a trapezoid the lower base of which is an absolute value of the first correction valve, the upper base of which is an absolute value of the full opening time difference, and the height of which is the maximum injection rate, thereby calculating a correction injection quantity.

The second calculation part 90 calculates the second correction value which is a pulse width necessary for injecting the fuel of the correction injection quantity. That is, the second calculation part 90, as shown in FIG. 5(*d*), calculates a base side of a parallelogram, the area of which is made to be equal to the correction injection quantity (the area of the trapezoid), as the second correction value. Specifically, the second correction value can be found by dividing the correction injection quantity by the maximum injection rate. In this regard, the second calculation part 90 is set in such a way as to find the second correction value as a plus value in the case where the response characteristic of the needle valve 60 is delayed with respect to the standard state (in the case where the first correction value is minus).

The correction part 92 corrects a pulse signal, which is determined on the next time and thereafter by the pulse signal determination means 76, on the basis of the first correction value calculated by the first calculation part 84 and the second correction value calculated by the second calculation part 90. Specifically, the correction part 92 makes a correction of advancing the output timing of the pulse signal determined on the next time and thereafter by the pulse signal determination means 76 by the absolute value of the first correction value (adding the first correction value of the minus value to the output timing). Further, the correction part 92 makes a correction of enlarging the pulse width determined by the pulse signal determination means 76 by the absolute value of the second correction value (adding the second correction value of the plus value to the pulse width).

[With Regard to Control Method of Gas Injection Valve 28]

A fuel injection control method by the CNG control ECU 50 will be described by the use of a flow chart shown in FIG. 6.

The pulse signal determination means 76 determines the pulse signal (the pulse width and the output timing) according to the driving state of the engine 10 based on the rotation speed of the engine 10 and an accelerator operation quantity (step S1: determination step). The pulse signal determination means 76 outputs the pulse signal to the electricity control means 74 at the determined output timing (step S2). When the electricity control means 74 receives the pulse signal, the electricity control means 74 supplies the electricity to the solenoid 62 from the battery 54 only for the specified time (the pulse width) (step S3). When the current flows through the solenoid 62, the current value sensing part 80 senses the current value of the current flowing through the solenoid 62 (step S4: sensing step). Next, the estimation part 82 calculates a differential value of the current from the current value sensed by the current sensing part 80 (step S5). The sensing of the current value by the current sensing part 80 and the calculation of the differential value of the current by the estimation part 82 are continuously performed for a period in which the current flows through the solenoid 62.

When the electricity control means 74 finishes supplying the electricity to the solenoid 62 from the battery 54 (step S6: YES), the estimation part 82 estimates that a timing when the differential value of the current first changes from "+" to "−" is the injection start timing and estimates that a timing when the differential value of the current first changes from "−" to "+" is the injection full opening timing (step S7: estimation step).

The first calculation part 84 calculates the first correction value from a difference between the standard injection start timing and the injection start timing (step S8). Further, the full opening time difference calculation part 86 calculates the full opening time difference from a difference between the standard injection full opening timing and the injection full opening timing (step S9).

The correction injection quantity calculation part 88 finds the area of a trapezoid in which: the absolute value of the first correction value is the lower base; the absolute value of the full opening time difference is the upper base; and the maximum injection rate is the height, thereby finding the correction injection quantity (step S10: first calculation step). Then, the second calculation part 90 calculates a base side of a parallelogram, the height of which is the maximum injection rate and the area of which is made to be equal to the correction injection quantity, as the second correction value (step S11: second calculation step).

Next, the pulse signal determination means 76 again determines a pulse signal (next pulse signal) on the basis of the driving state at that time (step S12). Then, the correction part 92 makes a correction of adding the first correction value and the second correction value to the pulse signal determined by the pulse signal determination means 76 (step S13). That is, the correction part 92 makes a correction of advancing the output timing by the absolute value of the first correction value and makes a correction of enlarging the pulse width by the absolute value of the second correction value. The pulse signal determination means 76 outputs the pulse signal to the electricity control means 74 at the corrected output timing (step S14). The electricity control means 74 supplies the electricity to the solenoid 62 from the battery 54 only for a time of the corrected pulse width (step S15).

Figure 7:
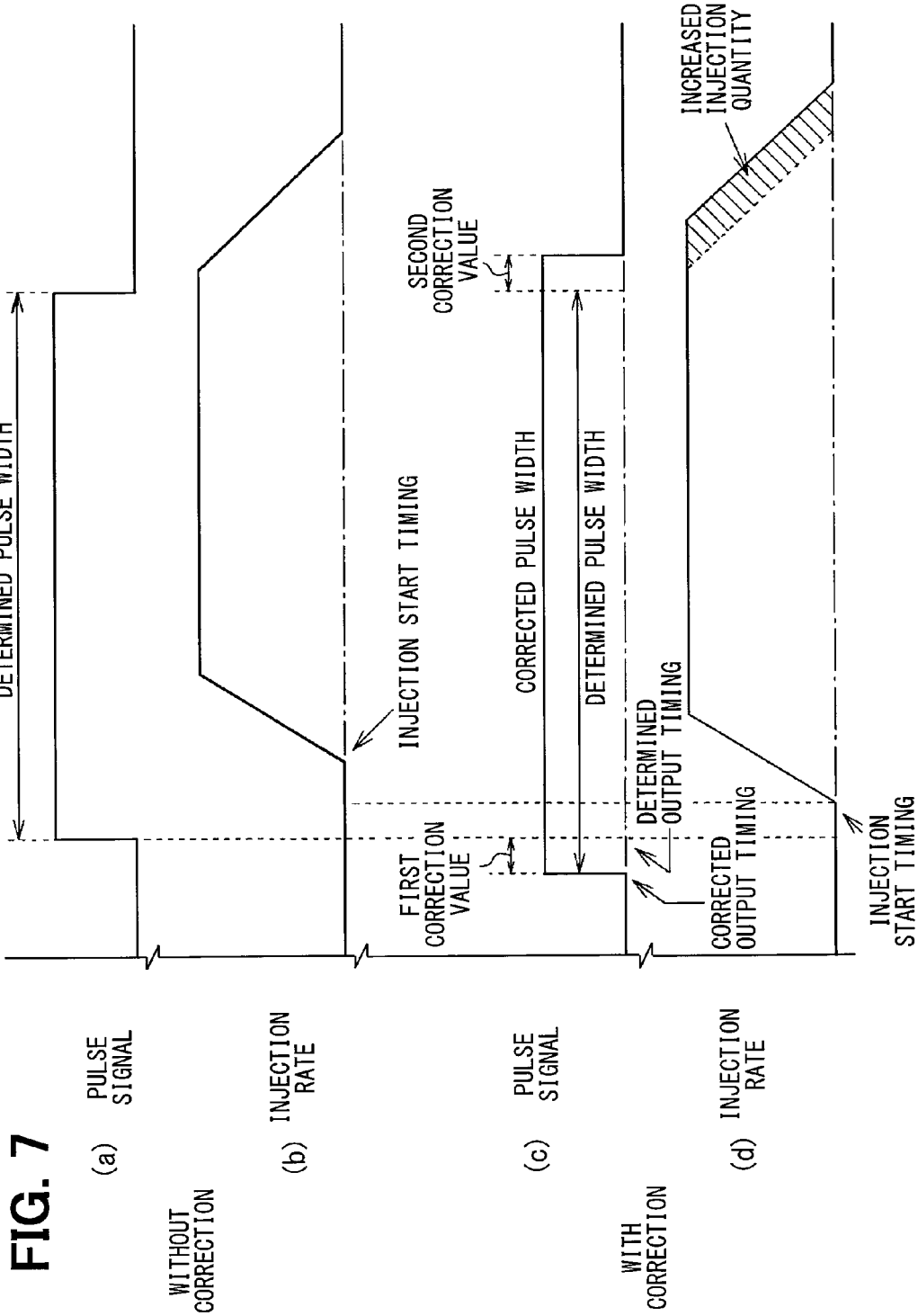
FIG. 7 are timing charts to show a pulse signal and an injection rate in a case where a correction is not made in comparison with those in a case where the correction is made.

FIGS. 7 are graphs to show a case where the pulse correction means 78 does not make the correction and a case where the pulse correction means 78 makes the correction. FIG. 7(a) shows a pulse signal in the case where the pulse correction means 78 does not make the correction, FIG. 7(b) shows an injection rate in the case where the pulse correction means 78 does not make the correction, FIG. 7(c) shows a pulse signal in the case where the pulse correction means 78 makes the correction, and FIG. 7(d) shows an injection rate in the case where the pulse correction means 78 makes the correction.

As shown in FIG. 7(c), the output timing of the corrected pulse signal is advanced by the absolute value of the first correction value from the output timing determined by the pulse signal determination means 76. As a result, the current early flows through the gas injection valve 28, and as shown in FIG. 7(d), also the injection start timing of the needle valve 60 is advanced by the absolute value of the first correction value. Hence, even in the state where the response characteristic of the needle valve 60 is delayed with respect to the standard state by an increase in the temperature of the solenoid 62, the timing when the CNG is injected from the gas injection valve 28 is not delayed with respect to the standard state but the CNG is injected at an appropriate timing.

As shown in FIG. 7(c), the pulse width of the pulse signal after the correction is made larger than the pulse width determined by the pulse signal determination means 76 by the absolute value of the second correction value. Hence, the period in which the electricity is supplied to the solenoid 62 is made longer by the absolute value of the second correction value, whereby the injection quantity of the CNG injected from the gas injection valve 28 can be increased. At this time, an increased injection quantity is equal to a decreased injection quantity caused by the delay of the response characteristic of the needle valve 60 (area of a trapezoid in FIG. 5(d)), so that an appropriate quantity of CNG can be supplied to the engine 10 by the pulse signal after the correction. That is, even if the response characteristic of the needle valve 60 is delayed with respect to the standard state, the injection quantity of the CNG to be supplied to the engine 10 can be prevented from being decreased.

As described above, according to the CNG control ECU 50 and the fuel injection control method according to the present embodiment, the following operation and effect can be produced.

1. By the use of the fact that when the injection of the fuel by the gas injection valve 28 is started or when the gas injection valve 28 is fully opened, the current of the solenoid 62 shows a maximum value or a minimum value respectively, the injection start timing and the injection full opening timing can be exactly estimated. The pulse signal is corrected on the basis of the estimated injection start timing and the estimated injection full opening timing, so that the injection start timing can be appropriately controlled.

2. The correction part 92 corrects the output timing and the pulse width of the pulse signal and hence can correct the timing and the injection quantity of the CNG injected from the gas injection valve 28 at the same time. Hence, even if the response characteristic of the needle valve 60 is delayed with respect to the standard state, an appropriate quantity of CNG can be supplied to the engine 10 at an appropriate timing. In this way, it is possible to solve the problem that the torque and the emission (HC) of the engine 10 will be increased by the delay of the injection timing.

3. The estimation part 82 calculates the differential value of the current value to thereby estimate that the timing when the current value becomes the maximum value is the injection start timing and to thereby estimate that the timing when the current value becomes the minimum value is the injection full opening timing. In other words, by accurately getting the behavior of the needle valve 60, the delay of the response characteristic of the needle valve 60 with respect to the standard state can be correctly found. Hence, the pulse signal can be corrected with a high accuracy.

4. The correction injection quantity calculation part 88 calculates the area of the trapezoid in which: the absolute value of the first correction value is the lower base; the absolute value of a finishing time difference is the upper base; and the maximum injection rate is the height as the correction injection quantity. In other words, by the use of the point that the maximum injection rate does not depend on the response characteristic of the needle valve 60, the correction injection quantity can be calculated by a simple calculation. Hence, a control load can be reduced and also the error at the time of the calculation can be reduced.

5. The second calculation part 90 calculates the base side of the parallelogram, the height of which is the maximum injection rate and the area of which is made to be equal to the area of the trapezoid described above, as the second correction value. In other words, by the use of the point that the behavior of the needle valve 60 when the needle valve 60 is closed depends on the resilient force of the valve spring 72 and the pressure of the CNG and does not have an effect on the response characteristic of the solenoid 62, the second correction valve can be found by a simple calculation. Hence, the control load can be reduced and also the error at the time of the calculation can be reduced.

6. Here, the CNG of the gaseous fuel is lower in a thermal conductivity than the liquid fuel such as gasoline and hence the effect of cooling the solenoid 62 by the CNG in the gas fuel injection control device is very small. For this reason, as compared with a solenoid (not shown) of the gasoline injection valve 30, which is cooled by the gasoline having a higher thermal conductivity, the solenoid 62 of the gas injection valve 28 has its temperature easily raised. Further, the gasoline of the liquid fuel has an effect of reducing the frictional resistance of the needle valve 60 in the fuel passage 64, but it is hardly expected that the CNG of the gaseous fuel has an effect of reducing the frictional resistance of the needle valve 60. However, the CNG control ECU 50 of the present embodiment gets the response characteristic of the needle valve 60 to thereby correct the pulse signal, so that even under the circumstance in which the response characteristic of the needle valve 60 is easily delayed with respect to the standard state as is the case with the CNG, the injection timing and the injection quantity of the CNG can be corrected with reliability.

In this regard, the control method of the gasoline control ECU 52 and the gasoline injection valve 30 can produce the same operation and effect as 1 to 5 described above.

[Modified Examples]

Figure 8:
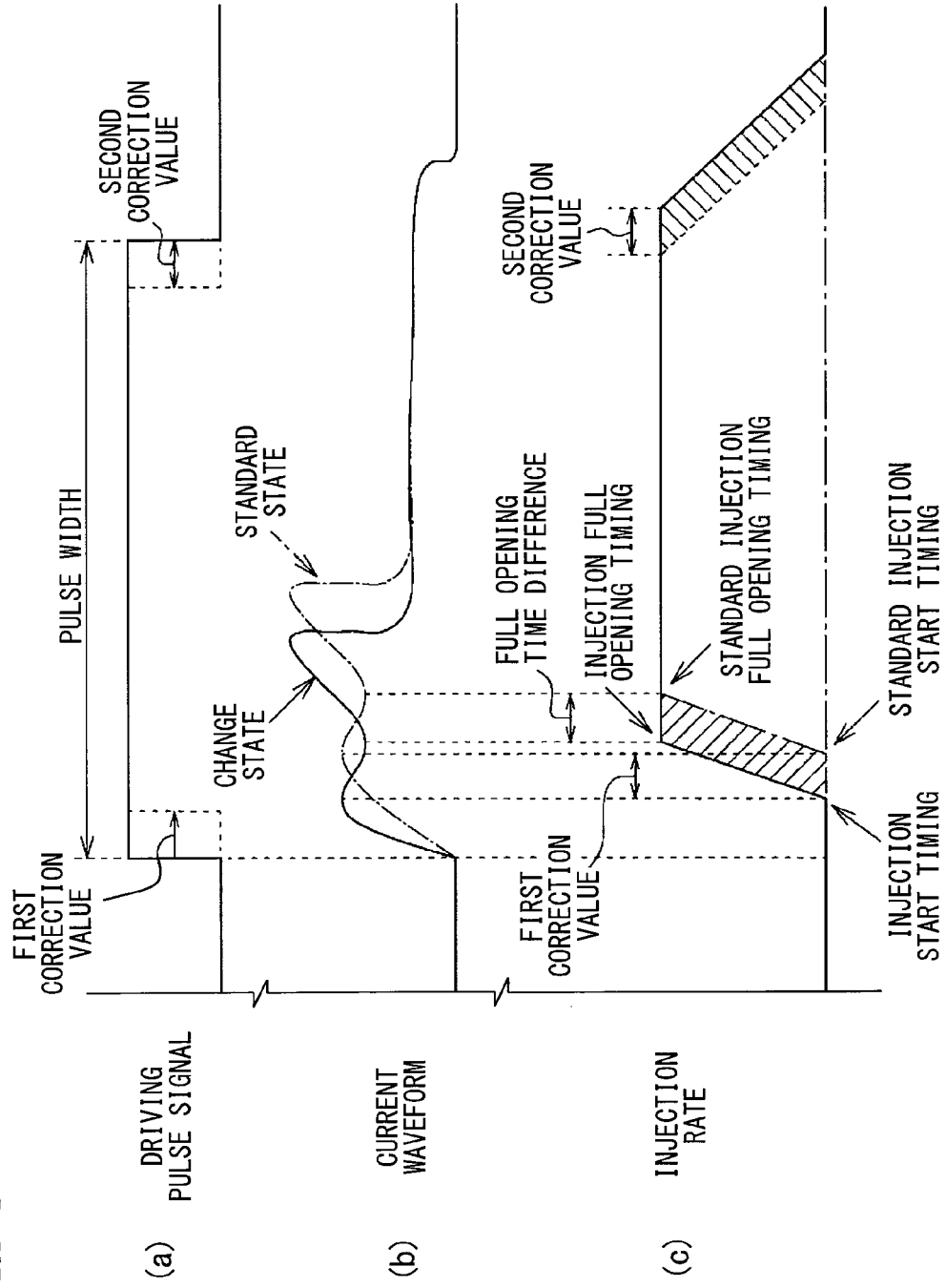
FIG. 8 are timing charts to show a case where electricity is supplied to a gas injection valve in a state where a response characteristic of a needle valve is advanced with respect to a standard state in comparison with the standard state.

(1) In the embodiment, the case where the pulse signal is corrected under the circumstance in which the response characteristic of the needle valve 60 is delayed with respect to the standard state by the increase in the temperature and the deterioration with time of the solenoid 62 has been described by way of example. However, for example, in the state where the electric resistance of the solenoid 62 is reduced because of a decrease in the temperature of the solenoid 62 or the like, the response characteristic of the needle valve 60 is advanced as compared with the standard state. FIGS. 8 are graphs to show timing charts in the case where the electricity is supplied to the solenoid 62 in the state where the response characteristic of the needle valve 60 is advanced as compared with the standard state. FIG. 8(*a*) shows a pulse signal, FIG. 8(*b*) shows a current value, and FIG. 8(*c*) shows an injection rate. In this regard, solid lines in FIGS. 8 show the state (change state) where the response characteristic of the needle valve 60 is advanced as compared with the standard state, whereas single dot & dash lines in FIGS. 8 show the standard state.

As shown in FIG. 8(*b*), in the state where the electric resistance of the solenoid 62 is reduced, when the pulse signal is inputted, the current value is rapidly changed (a change rate is large) and becomes a maximum value at a timing earlier than in the standard state. That is, as shown in FIG. 8(*c*), the injection start timing in the change state is made earlier than the standard injection start timing in the standard state. Hence, when the pulse signal is corrected, the pulse signal needs to be delayed by the first correction value (in this case, a plus value) which is the difference between the standard injection start timing and the injection start timing. The correction part 92 makes a correction of enlarging the output timing of the pulse signal by the absolute value of the first correction value (adding the first correction value of a plus value).

In the state where the response characteristic of the needle valve 60 is advanced as shown in FIG. 8(*c*), the timing when the current value becomes the minimum value is also advanced as compared with the standard state. That is, the injection full opening timing in the change state is advanced as compared with the standard injection full opening timing in the standard state. Hence, the injection quantity in the change state is made larger with respect to the standard state by the area of the trapezoid shown by the shaded portion on the left side of FIG. 8(*c*). When the pulse width is corrected, as shown in FIG. 8(*a*), the pulse width needs to be made shorter by the absolute value of the second correction value, whereby the injection quantity needs to be reduced.

Figure 6:
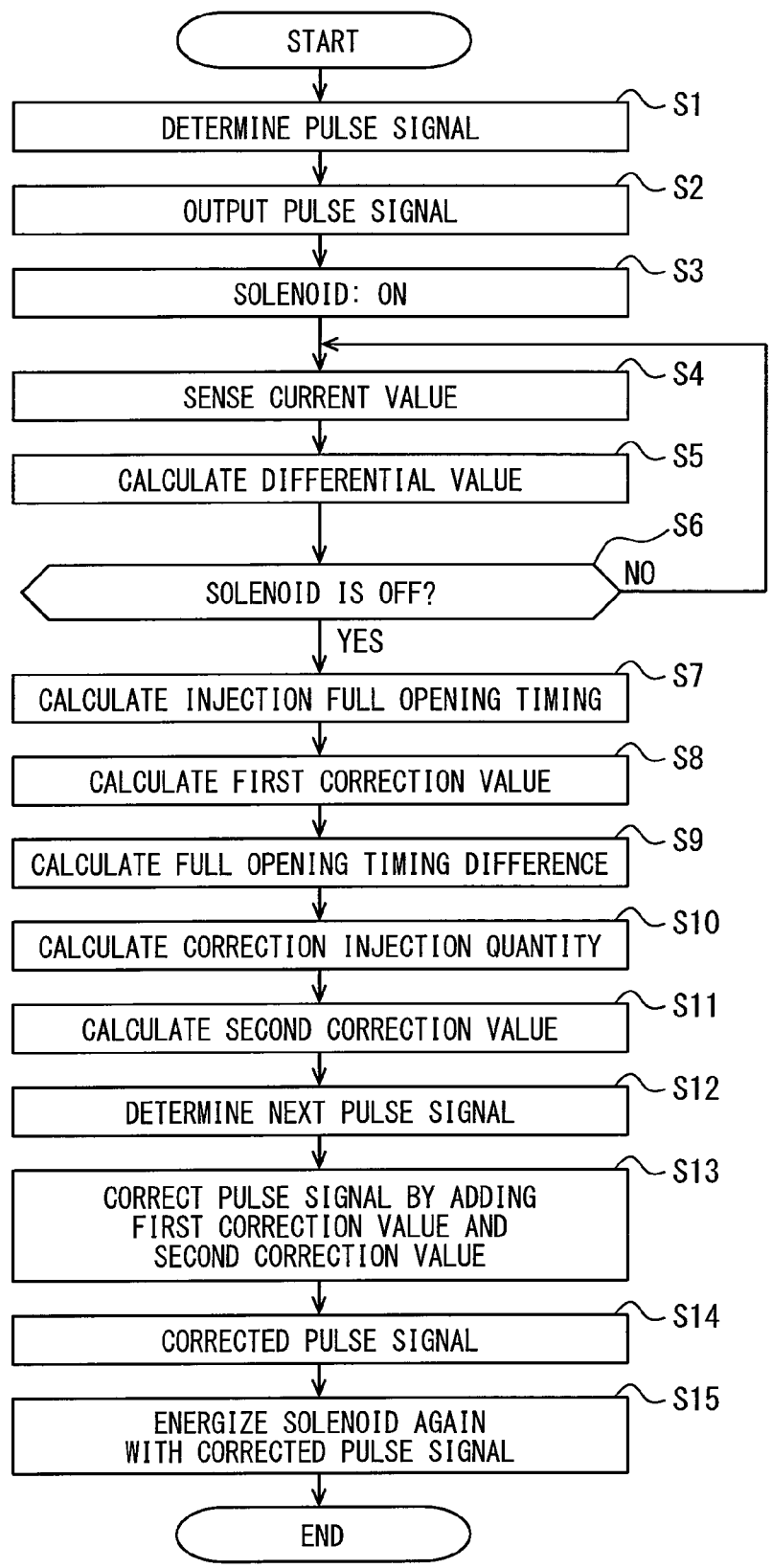
FIG. 6 is a flow chart of a fuel injection control by a CNG control ECU.

In the case where the first correction value is the plus value (that is, the response characteristic of the needle valve 60 is advanced as compared with the standard state), the second calculation part 90 calculates the second correction value as a minus value in the step S11 of FIG. 6. Then, the correction part 92 makes a correction of reducing the pulse width of the pulse signal by the absolute value of the second correction value (adding the second correction value of the minus value).

In this way, even in the case where the response characteristic of the needle valve 60 is advanced as compared with the standard state because of a decrease in the temperature of the solenoid 62 or the like, the correction part 92 makes the correction of delaying the output timing of the pulse signal by the absolute value of the first correction value as compared with the standard state and reducing the pulse width by the absolute value of the second correction value, whereby an appropriate quantity of fuel can be injected at an appropriate timing.

(2) In the present embodiment, there is provided the construction in which the correction part (setting means) 92 corrects the output timing and the pulse width for the pulse signal determined by the pulse signal determination means 76. However, both of the output timing and the pulse width of the pulse signal are not necessarily corrected. For example, when the construction is employed in which the correction part 92 corrects only the output timing of the pulse signal on the basis of the first correction value, the injection timing of the fuel injection valve can be appropriately controlled. In this case, the injection full opening timing, the correction injection quantity, and the second correction value do not need to be calculated.

Further, when the construction is employed in which the correction part 92 corrects only the pulse width of the pulse signal on the basis of the second correction value, the injection quantity of the fuel injection valve can be appropriately controlled. In this case, the second correction value does not need to be calculated.

(3) In the present embodiment, there are provided the control construction and the control method in which the correction part 92 as the setting means corrects the output timing and the pulse width for the pulse signal determined on the next time and thereafter by the pulse signal determination means 76. However, the correction part 92 may correct the pulse width of the pulse signal, for which the first correction value and the second correction value are calculated, in real time.

(4) In the present embodiment, there is provided the construction in which the correction part 92 makes the correction of adding the first correction value and the second correction value for the pulse signal determined by the pulse signal determination means 76. However, it is also recommended to employ a construction in which the pulse signal determination means 76 as the setting means directly sets the pulse signal on the basis of the injection start timing and the injection full opening timing which are estimated by the estimation part 82. That is, after the estimation part 82 once estimates the injection start timing and the injection full opening timing, the pulse signal determination means 76 may set an appropriate pulse signal on the basis of these estimated values.

(5) In the present embodiment, the CNG is employed as the gaseous fuel but the other fuel such as a liquefied petroleum gas (LPG) and a hydrogen gas can be employed as the gaseous fuel. Further, also as for the liquid fuel, the liquid fuel is not always limited to the gasoline but the other liquid fuel such as ethanol and a light oil can be appropriately employed as the liquid fuel. Still further, in the present embodiment, the bi-fuel engine 10 using the gaseous fuel and the liquid fuel at the same time has been described by way of example, but the present disclosure can be also applied to an engine using only the gaseous fuel or the liquid fuel.

(6) In the present embodiment, there is provided the construction in which two fuel injection control devices of the CNG control ECU 50 and the gasoline control ECU 52 are provided and control the gas injection valve 28 and the gasoline injection valve 30, respectively. However, it is also recommended to employ a construction in which one fuel injection control device controls both of the gas injection valve 28 and the gasoline injection valve 30.

(7) In the present embodiment, the battery 54 has been described as an example of the electricity supply means, but a battery of a hybrid automobile or the like may be employed as the electricity supply means. However, the current value of the solenoid 62 needs to be made to develop a maximum value and a minimum value by the electricity supplied from the electricity supply means.

(8) In the present embodiment, the estimation part 82 calculates the differential value of the current value of the solenoid 62 during the period in which the solenoid 62 is supplied with the electricity (step S5), but the calculation of the differential value of the current by the estimation part 82 may be made after the supply of the electricity to the solenoid 62 is finished. Further, in the present embodiment, it is estimated that the timing when the differential value of the current value first changes from "+" to "−" is the injection start timing and it is estimated that the timing when the differential value of the current value first changes from "−" to "+" is the injection full opening timing. However, it is also recommended to estimate that the timing when the differential value of the current value becomes "0" on the first time is the injection start timing and to estimate that the timing when the differential value of the current value becomes "0" on the second time is the injection full opening timing.

(9) In this regard, the correction of the pulse signal by the pulse correction means 78 does not need to be made every time. For example, the correction may be made in a specified cycle or the correction may be made at a specified time interval.

The present disclosure has been described in accordance with the embodiment, but it should be understood that the present disclosure is not limited to the embodiment and the structure described above. It should be understood that the present disclosure includes various modified examples and modifications within the scope equivalent to the present disclosure. In addition, it should be understood that not only various combinations and modes but also other combinations and modes which further include only one element and one or more or less element in addition to the various combinations and modes are included within the scope and the spirit of the present disclosure.

The invention claimed is:

1. A fuel injection control device controlling electricity to be supplied to a solenoid of a fuel injection valve by a pulse signal to thereby control an injection of fuel by the fuel injection valve, the fuel injection control device comprising:
 a current value sensing device sensing a current value to show a magnitude of current flowing through the solenoid when the fuel is injected by the fuel injection valve;
 an estimation device estimating an injection start timing when the injection of the fuel by the fuel injection valve is started and an injection full opening timing when the fuel injection valve is fully opened on the basis of a differential value of the current value sensed by the current value sensing device;
 a setting device setting the pulse signal on the basis of the injection start timing and the injection full opening timing which are estimated by the estimation device; and
 a control device controlling the electricity to be supplied to the solenoid of the fuel injection valve based on the pulse signal set by the setting device to thereby control the injection of fuel by the fuel injection valve.

2. A fuel injection control device as claimed in claim 1, wherein
 the setting device sets an output timing of the pulse signal that is a timing when the electricity is supplied to the solenoid.

3. A fuel injection control device as claimed in claim 1, wherein
 the setting device sets a pulse width of the pulse signal that is a period in which the electricity is supplied to the solenoid.

4. A fuel injection control device as claimed in claim 1, wherein
 the estimation device estimates that a timing when the current value first becomes a maximum value after the electricity is supplied to the solenoid is the injection start timing.

5. A fuel injection control device as claimed in claim 1, wherein
 the estimation device estimates that a timing when the current value first becomes a minimum value after the electricity is supplied to the solenoid is the injection full opening timing.

6. A fuel injection control device as claimed in claim 1, wherein the fuel is a gaseous fuel.

7. A fuel injection control device controlling electricity to be supplied to a solenoid of a fuel injection valve by a pulse signal to thereby control an injection of fuel by the fuel injection valve, the fuel injection control device comprising:
- a pulse signal determination device determining a pulse width and an output timing of the pulse signal;
- a current value sensing device sensing a current value to show a magnitude of current flowing through the solenoid by the electricity supplied to the solenoid on the basis of the pulse signal determined by the pulse signal determination device;
- an estimation device estimating an injection start timing when the injection of the fuel by the fuel injection valve is started and an injection full opening timing when the fuel injection valve is fully opened on the basis of a differential value of the current value sensed by the current value sensing device;
- a first correction value calculation device calculating a first correction value that is a difference between a standard injection start timing set in advance and the injection start timing estimated by the estimation device;
- a full opening time difference calculation device calculating a full opening time difference that is a difference between a standard injection full opening timing set in advance and the injection full opening timing estimated by the estimation device;
- a correction injection quantity calculation device calculating a correction injection quantity on the basis of the first correction value and the full opening time difference, the correction injection quantity being a difference between an injection quantity in a case where the fuel injection valve is activated at the injection start timing and the injection full opening timing which are estimated by the estimation device and an injection quantity in a case where the fuel injection valve is activated at the standard injection start timing and the standard injection full opening timing;
- a second correction value calculation device calculating a second correction value that is a time necessary for the fuel injection valve to inject the fuel of the correction injection quantity calculated by the correction injection quantity calculation device; and
- a setting device adding the first correction value calculated by the first correction value calculation device to the output timing of the pulse signal determined on the next time and thereafter by the pulse signal determination device and adding the second correction value calculated by the second correction value calculation device to the pulse width of the pulse signal; and
- a control device controlling the electricity to be supplied to the solenoid of the fuel injection valve based on the pulse signal to thereby control the injection of fuel by the fuel injection valve.

8. A fuel injection control device as claimed in claim 7, wherein
the correction injection quantity calculation device calculates an area of a trapezoid, in which: an absolute value of the first correction value is one base side; an absolute value of the full opening time difference is other base side; and an injection rate of the fuel when the fuel injection valve is fully opened is a height, as the correction injection quantity.

9. A fuel injection control device as claimed in claim 8, wherein
the second correction value calculation device calculates a base side of a parallelogram, the height of which is the injection rate of the fuel when the fuel injection valve is fully opened and the area of which is made to be equal to the area of the trapezoid, as the second correction value.

10. A fuel injection control method controlling electricity to be supplied to a solenoid of a fuel injection valve by a pulse signal to thereby control an injection of fuel by the fuel injection valve, the fuel injection control method comprising:
- a determination step determining a pulse width and an output timing of the pulse signal;
- a step controlling supply of the electricity to the solenoid of the fuel injection valve at the output timing and the pulse width of the pulse signal which are determined by the determination step to thereby control the injection of fuel by the fuel injection valve;
- a sensing step sensing a current value to show a magnitude of current flowing through the solenoid by the electricity supplied to the solenoid;
- an estimation step estimating an injection start timing when an injection of the fuel by the fuel injection valve is started and an injection full opening timing when the fuel injection valve is fully opened on the basis of a differential value of the current value sensed by the sensing step;
- a step calculating a first correction value that is a difference between a standard injection start timing set in advance and the injection start timing estimated by the estimation step;
- a step calculating a full opening time difference that is a difference between a standard injection full opening timing set in advance and the injection full opening timing estimated by the estimation step;
- a first calculation step calculating a correction injection quantity on the basis of the first correction value and the full opening time difference, the correction injection quantity being a difference between an injection quantity injected from the fuel injection valve in a case where the fuel injection valve is activated at the injection start timing and the injection full opening timing which are estimated by the estimation step and an injection quantity injected from the fuel injection valve in a case where the fuel injection valve is activated at the standard injection start timing and the standard injection full opening timing;
- a second calculation step calculating a second correction value that is a time necessary for the fuel injection valve to inject the fuel of the correction injection quantity calculated by the first calculation step; and
- a correction step adding the first correction value calculated by the first calculation step to the output timing of the pulse signal determined on the next time and thereafter by the determination step and adding the second correction value calculated by the second calculation step to the pulse width of the pulse signal to thereby correct the pulse signal.

11. A fuel injection control method as claimed in claim 10, wherein
the estimation step estimates that a timing when the current value first becomes a maximum value after the electricity is supplied to the solenoid is the injection start timing.

12. A fuel injection control method as claimed in claim 10 wherein
   the estimation step estimates that a timing when the current value first becomes a minimum value after the electricity is supplied to the solenoid is the injection full opening timing.

13. A fuel injection control method as claimed in claim 10, wherein
   the first calculation step calculates an area of a trapezoid, in which: an absolute value of the first correction value is one base side; an absolute value of the full opening time difference is other base side; and an injection rate of the fuel when the fuel injection valve is fully opened is a height, as the correction injection quantity.

14. A fuel injection control method as claimed in claim 13, wherein
   the second calculation step calculates a base side of a parallelogram, the height of which is the injection rate of the fuel when the fuel injection valve is fully opened and the area of which is made to be equal to the area of the trapezoid, as the second correction value.

\* \* \* \* \*